Aug. 10, 1937.   J. V. PETRELLI   2,089,570
SEALING DEVICE
Original Filed Dec. 30, 1933
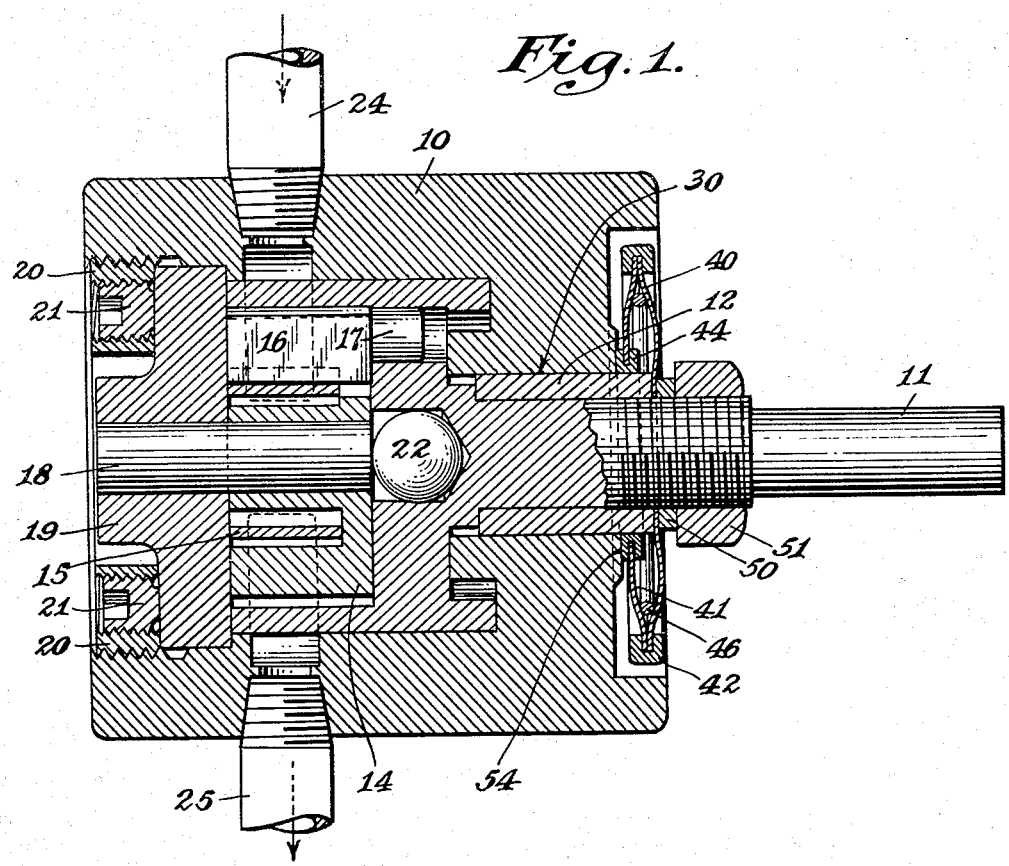
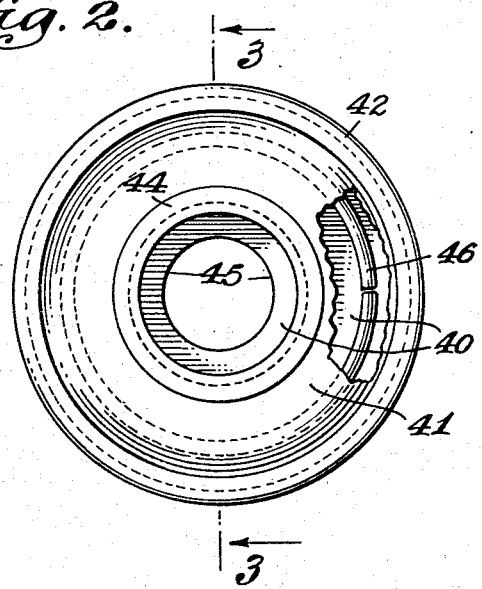
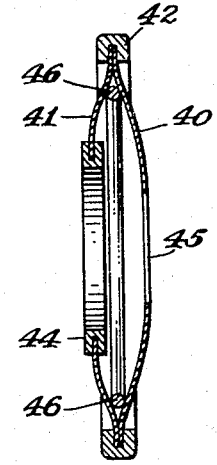
INVENTOR:
Joseph V. Petrelli
BY Ramsey & Kent
his ATTORNEY Patented Aug. 10, 1937

2,089,570

UNITED STATES PATENT OFFICE 2,089,570

SEALING DEVICE

Joseph V. Petrelli, New Rochelle, N. Y.

Application December 30, 1933, Serial No. 704,775
Renewed January 11, 1937

2 Claims. (Cl. 286—11)

This invention relates to improvements in sealing devices for rotary members and more particularly to sealing devices for the rotors of pumps and similar articles.

An object of the invention is to provide a new, simple and efficient sealing device for a rotary element to effectively prevent leakage between the rotary element and its bearing.

Another object of the invention is to provide a sealing device of the character set forth of such construction that leakage along the rotary element serves to increase the sealing effect produced by the sealing element.

In accordance with the present invention, a sealing device is provided for rotary elements, such as for example, the rotors of pumps of various types, of such character that the device can be readily secured to the rotary element and when in place will serve to prevent leakage of any appreciable amount. The device in the form illustrated is made up of a pair of diaphragms, the outer edges of which are secured together by means of a binding ring. These diaphragms are held spaced apart a slight distance from the binding region thereof by means of a spreader ring, and each diaphragm is provided with a central orifice. The wall of the orifice of one diaphragm is enclosed by a bearing ring of some suitable metal, while the wall of the orifice of the other diaphragm is unbound to permit the attachment of the composite sealing device to a rotary element. In practice the sealing device fits around a rotary element, such as the rotor shaft of a pump or similar article with the bearing ring engaging the casing of the pump or similar article. This ring fits closely around the rotary element and bears against a portion of the housing. Since the normal tendency of the sealing device when in place is for the two diaphragms to be separated at their portions remote from the outer edges thereof, the result will be that the bearing ring is forced against the housing under such pressure as to provide a good liquid-tight seal. Due to this seal, any leakage will occur along the rotor shaft into the space between the two diaphragms so that a continued leakage will build up a pressure between the two diaphragms which will tend to further separate them, with a resultant increase in pressure serving to force the bearing ring against the housing. Thus leakage in a force or other type of pump will be reduced to an absolute minimum.

Other features, objects and advantages of the invention will become apparent by reference to the following detailed description read in the light of the accompanying drawing forming a part of the same, wherein Fig. 1 is a vertical section of a pump construction with a sealing device installed in conjunction therewith.

Fig. 2 is a side elevation partially in section of the sealing device, and

Fig. 3 is a section taken substantially on the line 3—3 of Fig. 2.

Referring now to the drawing, 10 indicates generally the housing or casing of a pump which may be of any desired character. In the form illustrated, the pump is provided with a rotor shaft 11 having a sleeve or bearing collar 12 tightly secured thereon. This sleeve will rotate with the shaft 11 and is made of some suitable material for rotation within the housing with a minimum of friction. The other parts of the pump comprise an eccentric rotor 14, a ring 15, a number of vanes 16 (for example three), one of which has a stub-shaft 17 securing the eccentric rotor to an enlargement of the rotor shaft 11. A stationary eccentric shaft 18 is secured in a block 19 which is held in place by means of a binding ring 20 having a plurality of set screws 21 therein bearing against the block 19. A ball 22 serves as a thrust bearing between a portion of the rotor shaft 11 and the end of the stationary eccentric shaft 18. An inlet 24 and an outlet 25 are provided. Inasmuch as the particular construction of the working parts of the pump form no part of this invention, detailed description of these parts and their operation is omitted. It will be apparent that the invention described hereinafter can be applied to devices of various character.

Due to the construction of the pump as shown, it will be apparent that any leakage will take place between the bearing surface of the collar or sleeve 12 and the bearing surface 30 of the casing with which the surface sleeve 12 normally contacts. Accordingly, the invention is used for preventing undue leakage between these two parts.

The invention in the form shown consists of a diaphragm 40 and a second diaphragm 41. The outer edges of these two diaphragms are bound together by means of a binding ring 42 of suitable material. The inner diaphragm 41 has a central orifice, the wall of which is enclosed by means of a bearing ring 44 which extends over the surfaces of the diaphragm adjacent the orifice. This ring 44 is made of some suitable anti-friction material, such as phosphor bronze, or any other suitable material. The outer diaphragm 40 is likewise provided with a central aperture 45 of smaller diameter than the aperture of the inner diaphragm. The binding ring 42 is of such diameter that the two diaphragms when joined together are held with their central portions spaced apart as shown in Fig. 3. In order that any bending or flexing of the diaphragm occasioned by particular circumstances may be a bending localized in the inner portions thereof, a spreader ring 46 is positioned between the two diaphragms in such fashion as to act as a fulcrum for flexing of the diaphragms.

The installation and use of the sealing devices made up of the two diaphragms is substantially as follows: The device is slipped over the rotor shaft 11 with the diaphragm 41 nearest the casing 10 of the pump. The inner portion of the diaphragm 40 adjacent the opening 45 therein is brought up tight against the end of the collar or sleeve 12 and is held thereagainst for rotation with this sleeve by means of a washer 50 pressed against the diaphragm by means of a nut 51 screw threaded onto the shaft. When this nut 51 has been tightened sufficiently, the sealing device is locked to the rotor shaft so that it will rotate therewith. The proportion of parts is such that when the device is locked on a shaft the outer diaphragm 40 is flexed somewhat as shown in Fig. 1 with the result that the inner diaphragm 41 is forced toward the casing of the pump. This force serves to press the bearing ring 44 tightly against a bearing portion 54 of the casing, and if the contacting surfaces of the bearing ring and the housing are properly prepared, a substantially leak-tight joint will be produced.

Any leakage from the pump will be between the casing and the sleeve 12. This leakage will flow into the space between the two diaphragms, and if it continues under any appreciable pressure, the continued leakage will serve to build up a pressure in the space between the two diaphragms. Pressure in this space serves to further increase the tendency of the two diaphragms to separate, with the result that the bearing ring 44 is pressed with increasing tightness against the casing so that leakage will be reduced to an absolute minimum. On the other hand, if the pump is operating to produce a vacuum in a device to which it is connected, the leakage which would normally be occasioned by suction between the casing and the rotor will serve to first apply a pressure tending to straighten out the outer diaphragm 40, which as shown in Fig. 1 is slightly flexed. This tendency to straighten out will serve to move the binding ring 42 closer to the casing with the result that the bearing ring 44 is forced into tighter contact with the casing. Thus leakage which would tend to reduce the vacuum being established by the pump will be reduced to a minimum.

From the foregoing, it will be seen that the present invention provides a sealing device which operates to prevent leakage either of a pressure character or a vacuum character. It will be understood that the invention is not to be limited to the illustrated embodiment since it is capable of modification, but is to be limited only by the scope of the following claims.

I claim:

1. A sealing device for a rotary element comprising a pair of diaphragms, means for securing the outer edges thereof together to maintain the inner portions thereof in separation, said diaphragms being provided with central openings, a bearing ring secured to one of said diaphragms in position enclosing the edge of the central opening thereof, and a ring member between said diaphragms near the junction thereof to serve as a spreader for the diaphragms and as a fulcrum for flexing thereof.

2. A sealing device for a rotary element comprising a pair of initially flat diaphragms, said diaphragms having the boundary surfaces thereof in annular flat contact and having the portions thereof inwardly of the flat contacting portions sprung outwardly in separation within the elastic limit of the diaphragms whereby the diaphragms are radially contracted, a sealing ring having a groove therein of such diameter as to receive and retain the flatly contacting boundary edges of said diaphragms and to restrain said diaphragms against radial expansion, said diaphragms being provided with central openings, and a bearing ring secured to one of said diaphragms in position enclosing the edge of the central opening thereof.

JOSEPH V. PETRELLI.